(12) United States Patent
Kajiura

(10) Patent No.: US 6,362,594 B2
(45) Date of Patent: Mar. 26, 2002

(54) VEHICLE BATTERY CHARGER HAVING COOLING BLOWER PROVIDING IMPROVED COOLING EFFICIENCY

(75) Inventor: Katsuyuki Kajiura, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/731,959

(22) Filed: Dec. 7, 2000

(30) Foreign Application Priority Data

Dec. 14, 1999 (JP) .......................................... 11-354487

(51) Int. Cl.[7] .............................................. H01M 10/46

(52) U.S. Cl. ...................................... 320/104; 320/109

(58) Field of Search ................................ 320/108, 109, 320/104

(56) References Cited

U.S. PATENT DOCUMENTS 5,461,299 A * 10/1995 Bruni .......................... 320/109

* cited by examiner

*Primary Examiner*—Edward H. Tso
(74) *Attorney, Agent, or Firm*—Woodcock Washburn LLP

(57) ABSTRACT

An electromagnetic induction non-contact charger includes a stand and a power source device arranged on the stand. A feeding coupler is coupled to a cable extending from the power source device. The power source device includes an outer casing and a vertical duct arranged in the outer casing. An intake hole and an exhaust hole are provided at the bottom of the outer housing, and a blower is arranged in the outer casing above the duct, so that air is taken in from the intake hole, flows up in the outer casing and outside the duct, enters the duct via blower at the top of the duct, flows down in the duct, and is discharged from the exhaust hole. The duct is constructed using a cooling fin plate, and a circuit board is directly attached to the duct. The stand is tubular, and the exhaust hole is in communication with interior space of the stand. The stand has outlet holes and louvers which are attached to the stand.

11 Claims, 14 Drawing Sheets

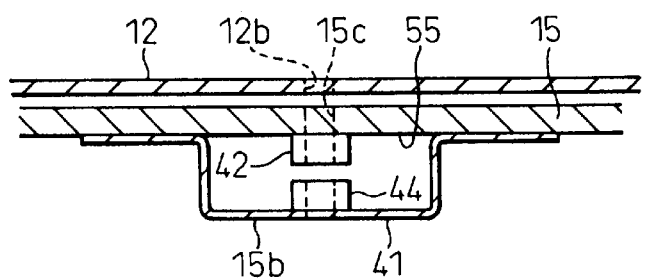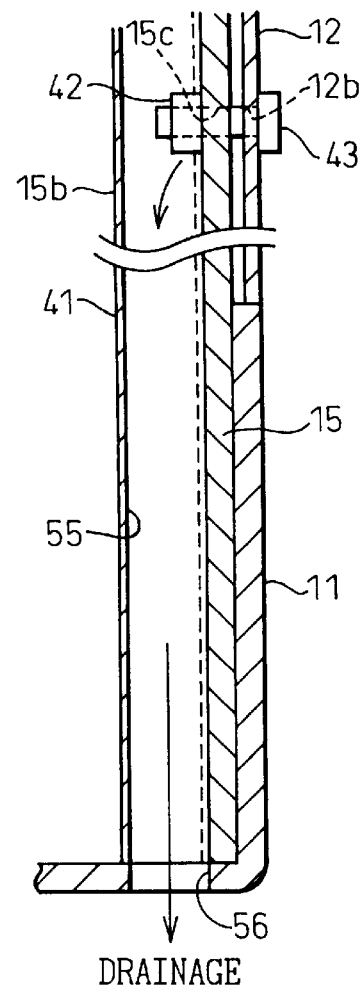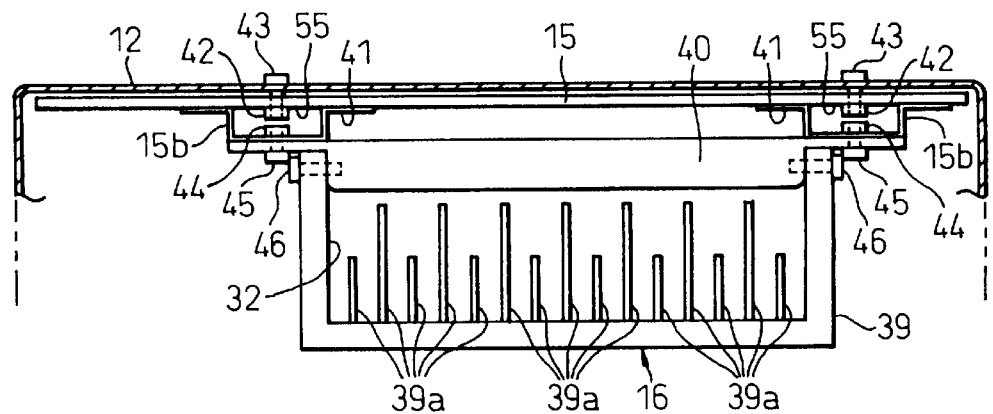

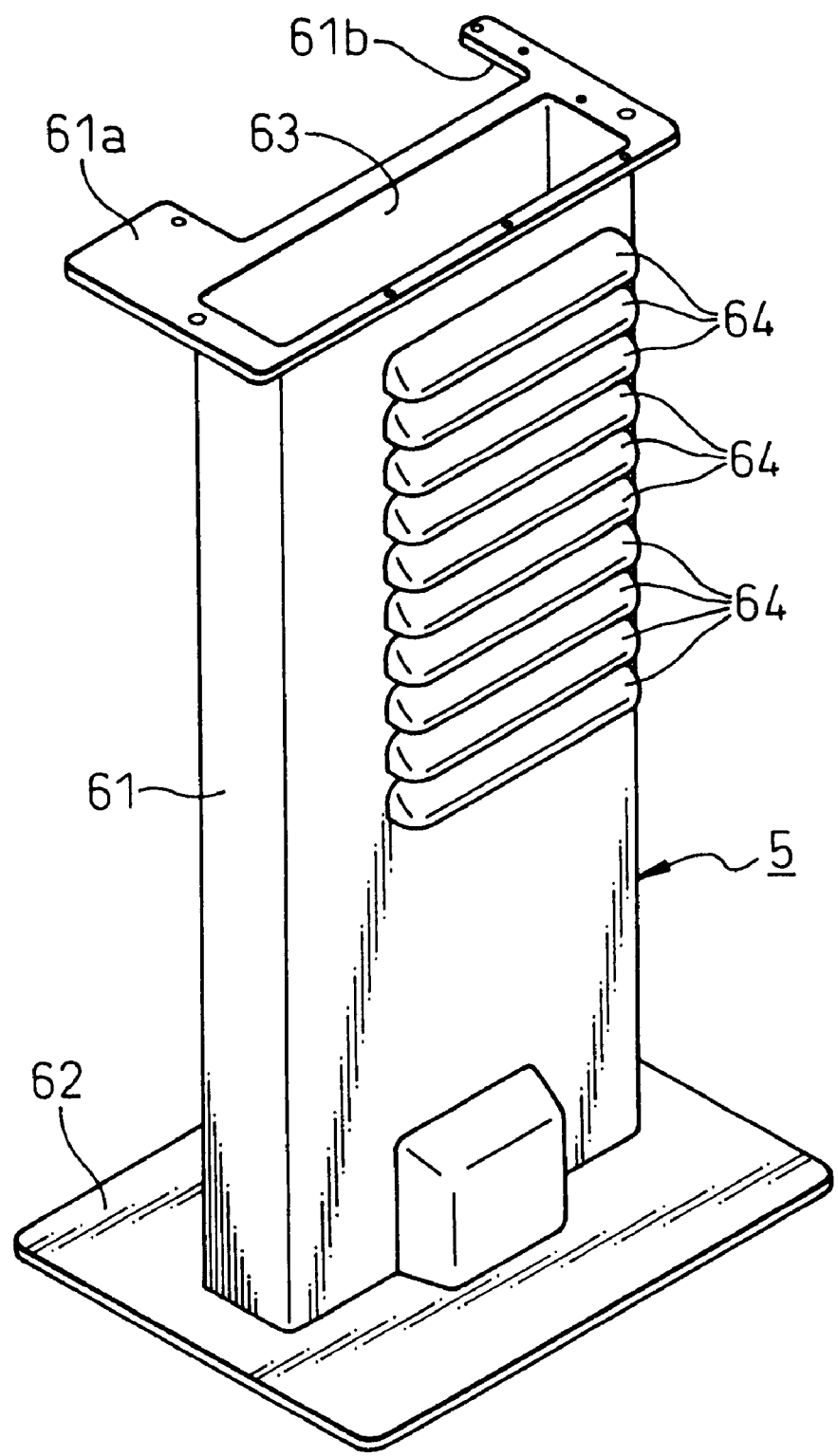

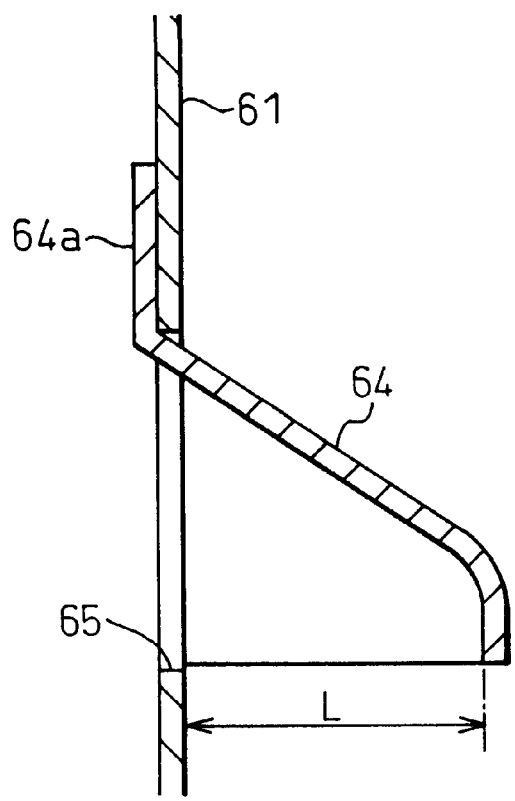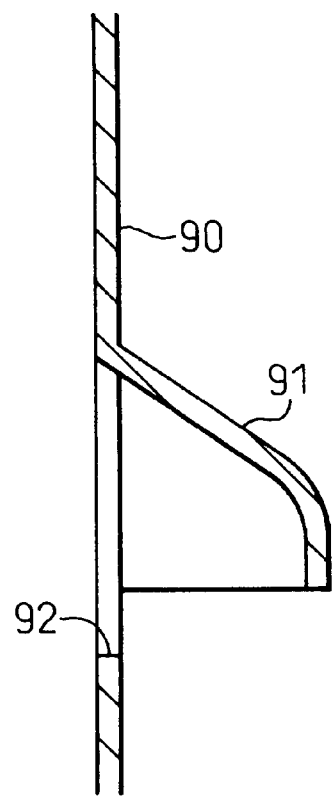

VEHICLE BATTERY CHARGER HAVING COOLING BLOWER PROVIDING IMPROVED COOLING EFFICIENCY

BACKGROUND OF THE INVENTION

1. Field of the Invention

The present invention relates to an electromagnetic induction non-contact charger for charging a vehicle such as an electric automobile, in a non-contact fashion, using an electromagnetic inductive system.

2. Description of the Related Art

In conventional vehicle chargers, there is an inductive charging system in which charging is completed by connecting a feeding coupler and a receiver (a receiving coupler) in a non-contact fashion using electromagnetic induction. When compared with a conductive charging system, the inductive charging system can provide advantages in that there is no concern about a contact failure and that the receiver installed on the vehicle can be miniaturized easily.

The inductive charger uses a commercial alternating current power source, for example, and comprises a power source device (a power supply device) which converts a commercial alternating current into a charging alternating current (at a predetermined frequency and a predetermined voltage) suitable for charging and a feeding coupler mounted on the distal end of a feeding cable extending from the power source device. The feeding coupler can be inserted into an coupler inserting port of the receiver installed on the electric automobile, and a power transmitting coil (a primary coil) is built in the inserting portion of the feeding coupler. On the other hand, a receiving coil (a secondary coil) and a conversion circuit for converting a received alternating current into a direct current for charging are built in the receiver provided on the electric automobile.

In charging the electric automobile, the feeding coupler is inserted into the coupler inserting port of the receiver installed on the electric automobile. On detecting the insertion of the feeding coupler, the power source device outputs a current (an alternating current) having a voltage value in accordance with a battery residual capacity obtained through communication with the electric automobile. when the current outputted from the power source device flows through the power transmitting coil built in the inserting portion of the feeding coupler, a voltage is induced in the receiving coil on the receiver under the action of electromagnetic induction for charging.

The charger is set up at a public facility (such as a parking lot) for public use as a charging stand (a stand-type charger) in which the power source device is arranged upright on the stand. In addition, for family use, a wall mounted type power source device is available which is hung on the exterior wall of a house using a mounting bracket. Both types of chargers are set up outside a building for use.

Power-system electric components including a circuit for converting a commercial alternating current into a charging alternating current, and control-system electronic components including a control circuit are built in the power source device, and in particular, the power-system electric components generate heat, which causes a problem.

Circuits are disposed in the form of a circuit board, for example, in a housing or outer casing of the power source device. The circuit board is mounted on a cooling fin plate, and a cooling blower (a fan unit) is provided for blowing air for cooling the cooling fin plate through heat exchange. An intake hole and an exhaust hole are formed in, for example, the bottom of the housing, and the blower device is so disposed that an airflow is generated which circulates within the housing between the intake hole and the exhaust hole. Conventionally, the blower is provided in the vicinity of the exhaust hole. This is because the airflow is prevented from being heated by heat generated by the blower.

In order to obtain a required cooling effect, the flow rate and flow velocity of an airflow need to be equal to or higher than a certain level and, in order to generate an airflow meeting the requirement, for example, a large-sized and high-powered blower is needed which can provide a strong blowing force because, in the construction in which the blower is disposed in the vicinity of the exhaust hole, the cooling efficiency remains low for the large blowing capacity. Additionally, it is considered that the heat exchange efficiency of a cooling fin plate depends more on the flow rate and flow velocity of an airflow than on the increase in temperature of the airflow due to heat generated by the blower when it is normally used and, for example, and this has caused a problem that a sufficient cooling efficiency cannot be provided in a case where a relatively small-sized blower is preferably used in an attempt to miniaturize, for example, the power source device.

Additionally, as a factor determining the flow rate and flow velocity of an airflow there is raised a flow path cross-sectional area along the full length of the flow path of an airflow, and a certain flow path cross-sectional area is required along the full length of the flow path of an airflow from where outside air is taken into the flow path to where the air so taken in is then let out of the flow path in order to increase the cooling efficiency. In addition, since hot air is let out of the exhaust hole, it has been considered that the discharged hot air may be taken into the intake hole and that the hot air so taken into deteriorates the cooling efficiency. In consideration of these situations, countermeasures have been demanded for improving the cooling efficiency of chargers. Note that since chargers are set outside the building as a charging stand or a wall mounted type charger, in many cases, waterproofing measures must also to be taken into consideration.

SUMMARY OF THE INVENTION

The present invention is made to solve the aforesaid problems, and a first object thereof is to provide a charger for a vehicle, which can sufficiently cool electric components built into a power source unit. A second object of the present invention is, in addition to the first object, to improve the waterproofing with a simple construction.

According to a first aspect of the present invention, there is provided a charger, for a vehicle, comprising a power source unit and a feeding coupler connected to said power source unit via cable and adapted to be coupled to a receiver of a vehicle, said power source unit comprising: an outer casing having a top, a bottom with an intake hole and an exhaust hole; a duct having a vertically extending passage disposed in said outer casing, said passage having an upper opening and a lower opening; and a cooling blower disposed in said outer casing above said duct so that said blower causes a flow of air in which air is taken in said casing from said intake hole, enters said passage of said duct via said upper opening, flows down in said passage, and flows out of said outer casing via said lower opening and said exhaust hole.

In this arrangement, when the blower is driven, air is forced into the passage from the opening in the upper portion of the duct, an airflow is generated by the outside air, which is taken into the outer casing from the intake hole in the lower portion of the outer casing, being sent upward, then descending along the passage in the duct, and finally leaving from the exhaust hole. The electric components (including a circuit board) disposed in the outer casing are cooled by this airflow. Since the blower is disposed on the upper portion of the duct and an air suction system is adopted in which the blower is located at an intermediate position along the length of the airflow path, an airflow having required flow rate and flow velocity can be generated within the passage in the duct with a relatively weak blowing force, and this can increase the cooling efficiency. In addition, since the blower is disposed on the upper portion of the duct and, hence, the blower is located at a relatively high position within the outer casing, should water penetrate into the interior of the outer casing, the blower is not submerged in the water penetrating into the outer casing.

Preferably, the duct comprises a cooling fin plate formed into a duct-like shape, and a circuit board having electric components mounted thereto is directly attached to the cooling fin plate.

In this arrangement, in addition to the operation set forth in the first aspect, the heat generated at the circuit board is heat exchanged via the cooling fin plate by the airflow passing the passage in the duct, whereby the circuit board is efficiently cooled. In addition, since the cooling fin plate also functions as a constituting component of the duct, the number of components used can be reduced, and this facilitate making compact the interior of the outer casing, whereby miniaturization of the power source device is made possible.

Preferably, the support board to which the duct is attached is made of metal.

In this arrangement, in addition to the above operation, since the support board to which the duct is attached is metallic and provides a high heat conductivity, the heat escapes from the duct to the support board, whereby the cooling effect on the electric components constituting the circuit board is increased.

Preferably, the top of the outer casing is inclined, and the blower is disposed in an inclined posture in accordance with the inclination of the top of the outer casing.

In this arrangement, even though the top of the outer casing is inclined, the height of the outer casing can relatively be low, whereby the miniaturization of the power source unit can be facilitated.

According to a second aspect of the present invention, there is provided a charger, for a vehicle, comprising a power source unit and a feeding coupler connected to said power source unit via a cable and adapted to be coupled to a receiver of a vehicle, said power source unit comprising: an outer casing having a top, a bottom with an intake hole and an exhaust hole; a duct having a vertically extending passage disposed in said outer casing, said passage having an upper opening and a lower opening; a cooling blower disposed in said outer casing above said duct so that said blower causes a flow of air in which air is taken into said casing from said intake hole, enters said passage of said duct via said upper opening, flows down in said passage, and flows out of said outer casing via said lower opening and said exhaust hole; and a support board to which said duct is attached being made of metal, said outer casing being assembled onto said support board.

In this arrangement, when the cooling blower is driven, an airflow is generated in which the outside air is taken into the outer casing from the intake hole in the lower portion of the outer casing and is then caused to descend along the passage in the duct and is finally let out from the exhaust hole in the lower portion of the outer casing. The electric components (including the circuit board) disposed inside the outer casing are cooled. Since the support board to which the duct is attached is made of metal and hence has a high heat conductivity, the heat escapes from the duct to the support board, whereby the cooling effect on the electric components can be improved. The number of components disposed within the outer casing can be reduced, the miniaturization of the power source device being facilitated.

Preferably, a reinforcing tubular structure is formed on the support board, the outer casing being fixed to the tubular structure by fastening members extending in assembling holes formed in the tubular structure, the interior of the tubular structure which communicates with the assembling holes functioning as a water drain passage.

In this arrangement, the outer casing is assembled to the support board via the assembling holes formed in the tubular structure using the fastening members. Even if water penetrates into the outer casing from a gap between the fastening member and the assembling hole, the water so penetrating flows downward through the drain passage within the interior of the tubular structure and is let out of the drain passage. Consequently, a risk that the electric components accommodated within the outer casing are submerged in water is eliminated. In addition, since reinforcement is implemented with the tubular structure, with the support board, it is possible to secure a high strength for the thickness of the support board.

Preferably, an electric circuit is disposed in the passage of the duct.

In this arrangement, since the electric circuit is disposed within the passage in the duct, not only can the electric circuit be cooled, but also the accommodating space within the outer casing can be saved on, whereby this construction can contribute to the miniaturization of the power source.

According to a third aspect of the present invention, there is provided a charger, for a vehicle, comprising a power source unit, a feeding coupler connected to said power source unit via a cable and adapted to be coupled to a receiver of a vehicle, and a stand supporting the power source unit; said power source unit comprising: an outer casing having a top, a bottom with an intake hole and an exhaust hole; a duct having a vertically extending passage disposed in said outer casing, said passage having an upper opening and a lower opening; a cooling blower disposed in said outer casing above said duct so that said blower causes a flow of air in which air is taken into said casing from said intake hole, enters said passage of said duct via said upper opening, flows down in said passage, and flows out of said outer casing via said lower opening and said exhaust hole; said stand comprising a tubular body having an internal space and outlet holes formed through said tubular body, said power source unit being fixed to said stand with said exhaust hole in communication with said internal space; and louvers formed separately from and attached to said tubular body so that said louvers substantially cover said outlet holes, as viewed in a direction perpendicular to an outer surface of said tubular body, and an extending length of said louver measured from said tubular body in said direction is longer than that of a louver which is formed by a drawing process.

In this arrangement, when the cooling blower is driven, an airflow is generated in which the outside air is taken into the outer casing from the intake hole in the lower portion of the outer casing and is then caused to descend along the passage in the duct and is finally let out from the exhaust hole in the lower portion of the outer casing. The electric components (including the circuit board) disposed inside the outer casing are cooled. The exhaust air let out from the exhaust hole into the interior of the stand is guided from the outlet holes to the louvers, where it is discharged to the outside. In this case, the louvers are made as the separate members for fixation, and when compared with one formed through a drawing process, the extending length over which the louver extends is made longer and the opening area of the louver can be secured wider, whereby the flow cross-sectional area along the full length of the airflow path can be secured widely, and the circulation of the air in the outer casing is improved, whereby a better waterproof effect can be obtained. In addition, since the louvers extend such that the exhaust hole is substantially concealed thereby when viewed from the front, rain or the like will tend not to enter the stand through the outlet holes, whereby the waterproof effect within the stand can be secured.

Preferably, a resin distribution box to which a power source wiring connected to the power source unit is connected is disposed in the stand below the outlet holes and wherein an air shielding member is provided for preventing hot air let out from the exhaust hole from flowing toward the distribution box.

In this arrangement, the hot air let out from the exhaust hole is guided toward the outlet holes in such a manner as to be prevented from flowing toward the resin distribution box by the air shielding member. Due to this, the resin distribution box disposed inside the stand is protected from the hot air.

According to a fourth aspect of the present invention, there is provided a charger, for a vehicle, comprising a power source unit and a feeding coupler connected to said power source unit via a cable and adapted to be coupled to a receiver of a vehicle, said power source unit being of a wall mounted type and comprising: an outer casing having a top, a bottom with an intake hole and an exhaust hole; a duct having a vertically extending passage disposed in said outer casing, said passage having an upper opening and a lower opening; a cooling blower disposed in said outer casing above said duct so that said blower causes a flow of air in which air is taken in said casing from said intake hole, enters said passage of said duct via said upper opening, flows down in said passage, and flows out of said outer casing via said lower opening and said exhaust hole; and a partition member disposed below said outer casing for separating a region including said exhaust hole from a region including said intake hole.

In this arrangement, when the cooling blower is driven, an airflow is generated in which the outside air which is taken into the outer casing from the intake hole in the lower portion of the outer casing, is then caused to descend along the passage in the duct and is finally let out from the exhaust hole in the lower portion of the outer casing. The electric components (including the circuit board) disposed inside the outer casing are cooled. The air entering the intake hole and the air let out of the exhaust hole are separated from each other by the partition member provided at the lower portion of the outer casing so as not to mix with each other. This eliminates a risk of the hot air let out of the exhaust hole being taken directly into the intake hole. This allows relatively low temperature air to be taken into the outer casing, whereby the cooling effect on the electric components provided inside the outer casing can be improved.

BRIEF DESCRIPTION OF THE DRAWINGS

The present invention will become more apparent from the following description of the preferred embodiments, with reference to the accompanying drawings in which:

FIG. 6A is a top sectional view of the tubular structure;

FIG. 6B is a side sectional view of the tubular structure;

FIG. 7 is a diagrammatic plan view of the duct assembling structure;

FIG. 10 is a perspective view of the stand;

FIG. 11A is a side sectional view of the louver structure;

FIG. 11B is a side sectional view of a louver formed by a drawing process;

DESCRIPTION OF THE PREFERRED EMBODIMENTS

Referring to FIGS. 1 to 14, an embodiment of the present invention will be described, below, in which the present invention is embodied as an electromagnetic induction non-contact type battery charger for a vehicle.

Figure 14:
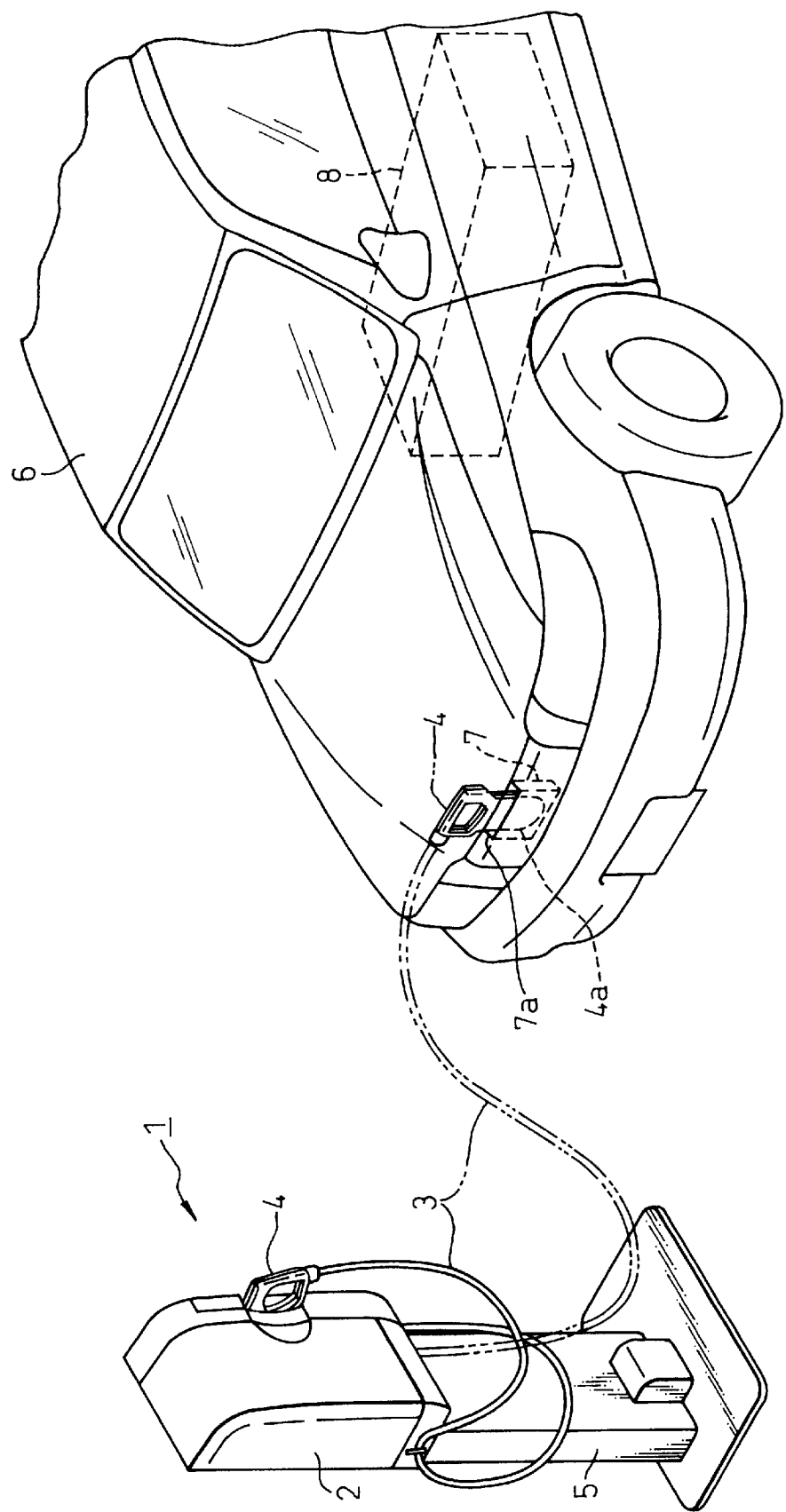
FIG. 14 is a perspective view of the electromagnetic induction non-contact type charger and a vehicle.

As shown in FIG. 14, the electromagnetic induction non-contact type battery charger (hereinafter, referred to as a charger) 1 is a stand type charger which is set on the ground. The charger 1 comprises a power source device (a power supply device) 2 as a power source unit and a feeding coupler 4 provided at a distal end of a cable 3 extending from the power source device 2. In the embodiment, a paddle type feeding coupler 4 is adopted in which the feeding coupler 4 is formed into a paddle shape (a flat plate shape) (hereinafter, the feeding coupler is referred to as a feeding paddle). The power source device 2 is supported by a stand 5 arranged upright on the ground.

The feeding paddle 4 has an inserting portion 4a adapted to be removably inserted into a paddle inserting opening 7a of a receiving charge port (a receiving coupler) 7 as a receiver arranged at a selected position (for example, at a front part of a bonnet) in an electric automobile 6 as a vehicle.

In charging the electric automobile 6, the inserting portion 4a of the feeding paddle 4 is inserted into the paddle inserting opening 7a of the receiving charge port 7, as shown by dotted lines in FIG. 14. When the feeding paddle 4 is connected to the receiving charge port 7, a communication is established between them, and the power source device 2 sets a preferred charging condition based on information obtained from the electric automobile 6 regarding the residual capacity of the battery or the like, converts a commercial alternating current into a charging current (at a predetermined voltage and a predetermined frequency) and outputs the alternating current so converted to the feeding paddle 4. Then, the receiving charge port 7 is supplied with electric power under the action of electromagnetic induction based on an alternating current supplied from the power source device 2 and flowing through a coil built in the feeding paddle 4, whereby the battery 8 installed on the electric automobile 6 is recharged.

Figure 2:
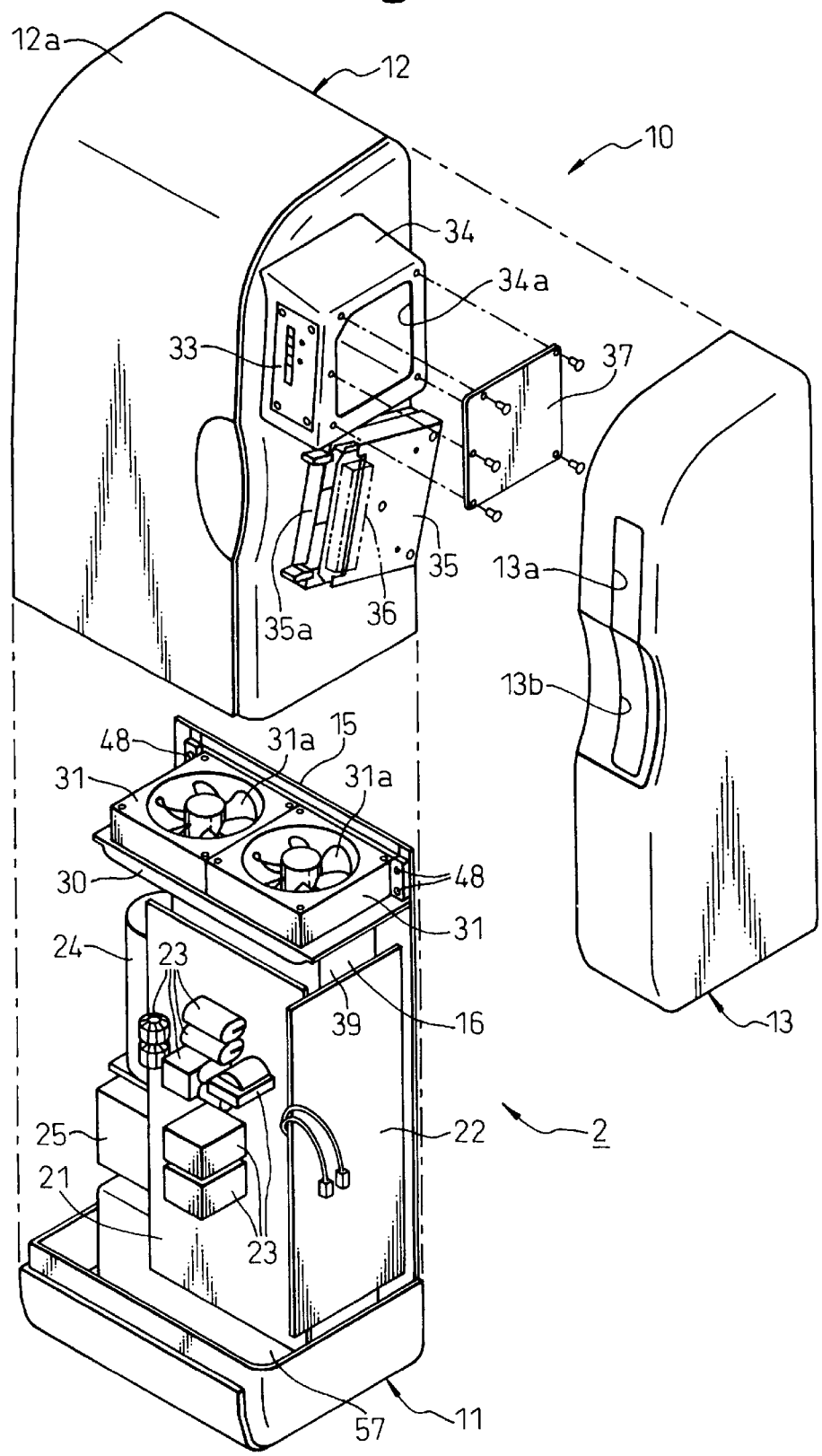
FIG. 2 is an exploded perspective view of the power source device of the charger of FIG. 1.

The structure of the power source device 2 will be described. As shown in FIG. 2, a metallic (for example, iron or aluminum) housing 10 as an outer casing constituting the power source device 2 comprises a lower housing 11 assembled onto the upper surface of the stand 5 provided upright on the ground, a rectangular tubular upper housing 12 having a closed upper end, and a side cover 13 for covering the right-hand side of the upper housing 12. The upper surface 12a of the upper housing 12 has an inclined surface which moderately inclines toward the front thereof.

A back board 15 as a support board is welded to and is integral with the lower housing 11. A rectangular tubular duct 16 is attached to the front surface of the back board 15, and a power-system circuit board 21 and a control-system circuit board 22 are directly attached to the front surface and the side surface (right-hand side surface) of the duct 16, respectively. Electric components (electronic components) 23 constituting a power-system circuit such as a rectification circuit, a power factor improving circuit and a resonance converter are installed on the power system circuit board 21. A capacitor 24 and a coil (a resonance coil) 25, which constitute the power-system circuit and are relatively heavy, are supported by the back board 15 via brackets 26 and 27 and disposed by the power-system circuit board 21 (on the left-hand side thereof). The various circuits of the power system are used for converting a commercial alternating current into a charging alternating current having a voltage increased in accordance with the charging condition and a predetermined frequency.

In addition, electronic components (including a CPU) (not shown) constituting various types of control circuits for governing the control of the power system circuits and the control of communication of communication circuits (for example, an infrared communication circuit and a radio communication circuit) built into the feeding paddle 4 are installed on the circuit board 22 of the power system. The CPU constituting the control circuits controls the rectification circuit, the power rate improving circuit and the resonance converter so that charging can be carried out in a proper charging condition in response to a residual capacity of the battery obtained from the electric automobile 6 as a result of communication. In particular, a direct current obtained by rectifying the alternating current inputted from a commercial alternating current power source is converted into, for example, an alternating current of several tens kHz for output to the cable 3 (refer to FIG. 14). The alternating current outputted to the cable 3 flows through a power transmitting coil (a primary coil) in the feeding paddle 4 and is then transmitted to a receiving coil (a secondary coil) in the receiving charge port 7 under the action of electromagnetic induction (both coils are not shown).

Figure 1:
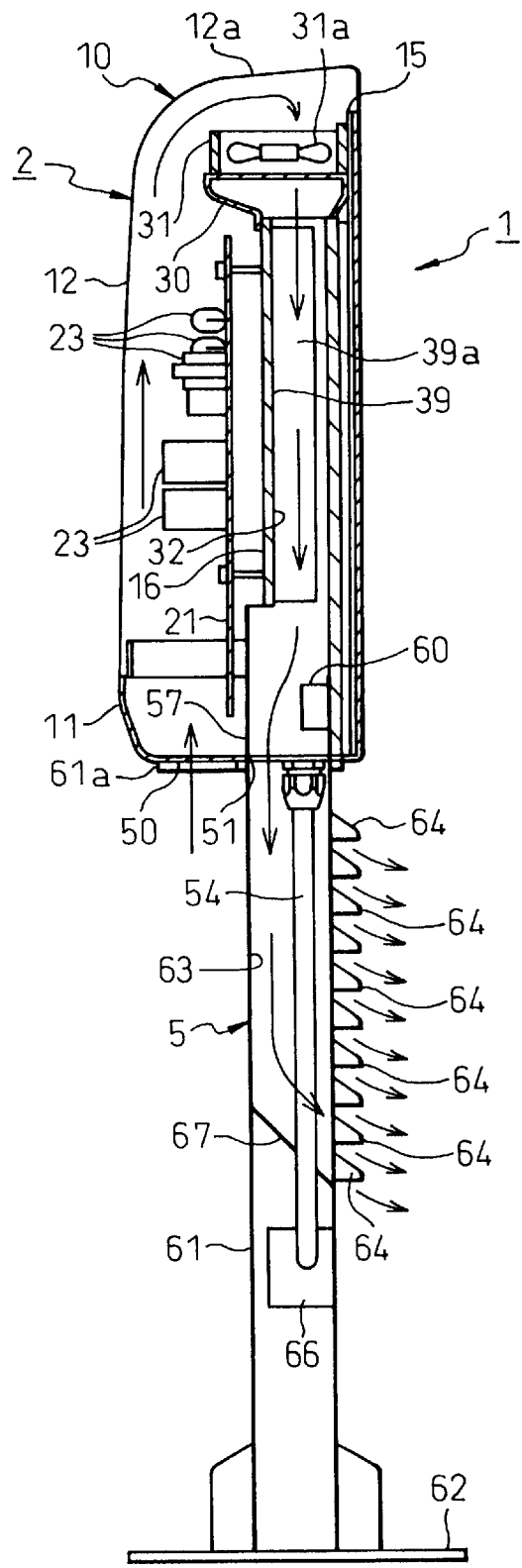
FIG. 1 is a diagrammatic side view of an electromagnetic induction non-contact type battery charger according to a first embodiment of the present invention.

As shown in FIGS. 1 and 2, the duct 16 has at the top thereof an approximately rectangular tubular hood 30 the size of which increases toward its top, and a pair of left and right blowers (fan units) 31 are disposed horizontally in the upper opening in the hood 30. The blowers 31 are driven when a temperature detected by a temperature sensor (not shown) for detecting the temperature in the housing 10 reaches or exceeds a set temperature. The blowers 31 are designed to generate a flow of cooling air, in the housing 10, by forcibly introducing cooling air into a passage 32 from above the duct 16, during the rotation of fans 31a thereof; an air-forcing system is adopted in which a source for blowing air is located at a position above the duct 16 which corresponds to a substantially intermediate position of the airflow path inside the housing 10. In order to provide a flow rate and a flow velocity of an airflow delivered in the duct 16 which are equal to or greater than a selected value, the cross-sectional area of the passage in the duct 16 is set narrower than that of a portion where the two blowers are disposed.

As shown in FIG. 2, a box portion 34 into which an indicator 33 is incorporated is integrally formed with the right-hand side surface of the upper housing 12, and a paddle resting case 35 for removably receiving the inserted paddle 4 is assembled onto the same surface below the box portion 34. A residual capacity (a recharged condition) of the battery obtained from the electric automobile 6 through the communication is indicated. An opening 34a is formed in the box portion 34 for performing wiring operations for the indicator 33 and the sensor 36, and the opening 34a is closed by a metallic cover 37 after the required wiring work has been completed whereby electromagnetic shielding is provided. Additionally, openings 13a and 13b are formed in the side cover 13 so that front surfaces of the indicator 33 and the paddle inserting opening 35a of the paddle resting case 34 are exposed therefrom.

Figure 3:
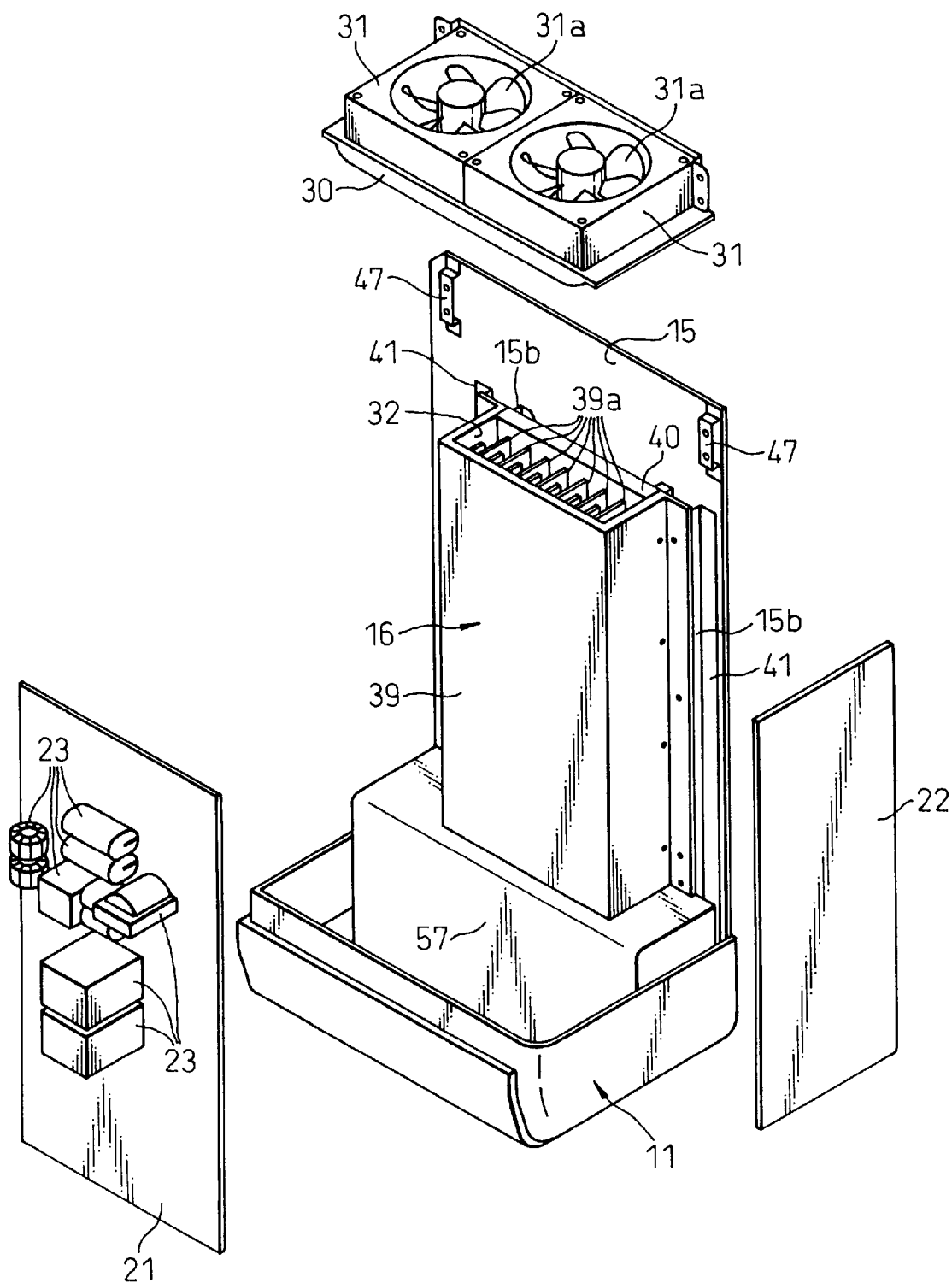
FIG. 3 is an exploded perspective view of the cooling structure in the power source device.

As shown in FIGS. 3 and 7, the duct 16 is constructed, of an angled cooling fin plate 39, into a duct-like shape to which the circuit boards 21 and 22 are directly attached. Namely, the cooling fin plate 39 is formed into a U-shape in cross section and constitutes a base portion providing number of fins 39a formed on the back surface thereof so that the fins 39a so formed are located within the passage 32. The cooling fin plate 39 is fixed to a metallic base board 40 supported by the back board 15, to form a tubular configuration, whereby the duct 16 is formed. The numerous fins 39a extend from the inner wall surface of the front side of the passage 32 of the duct 16. The cooling fins 39a are formed of a metal having a high heat conductivity such as aluminum.

Figure 4:
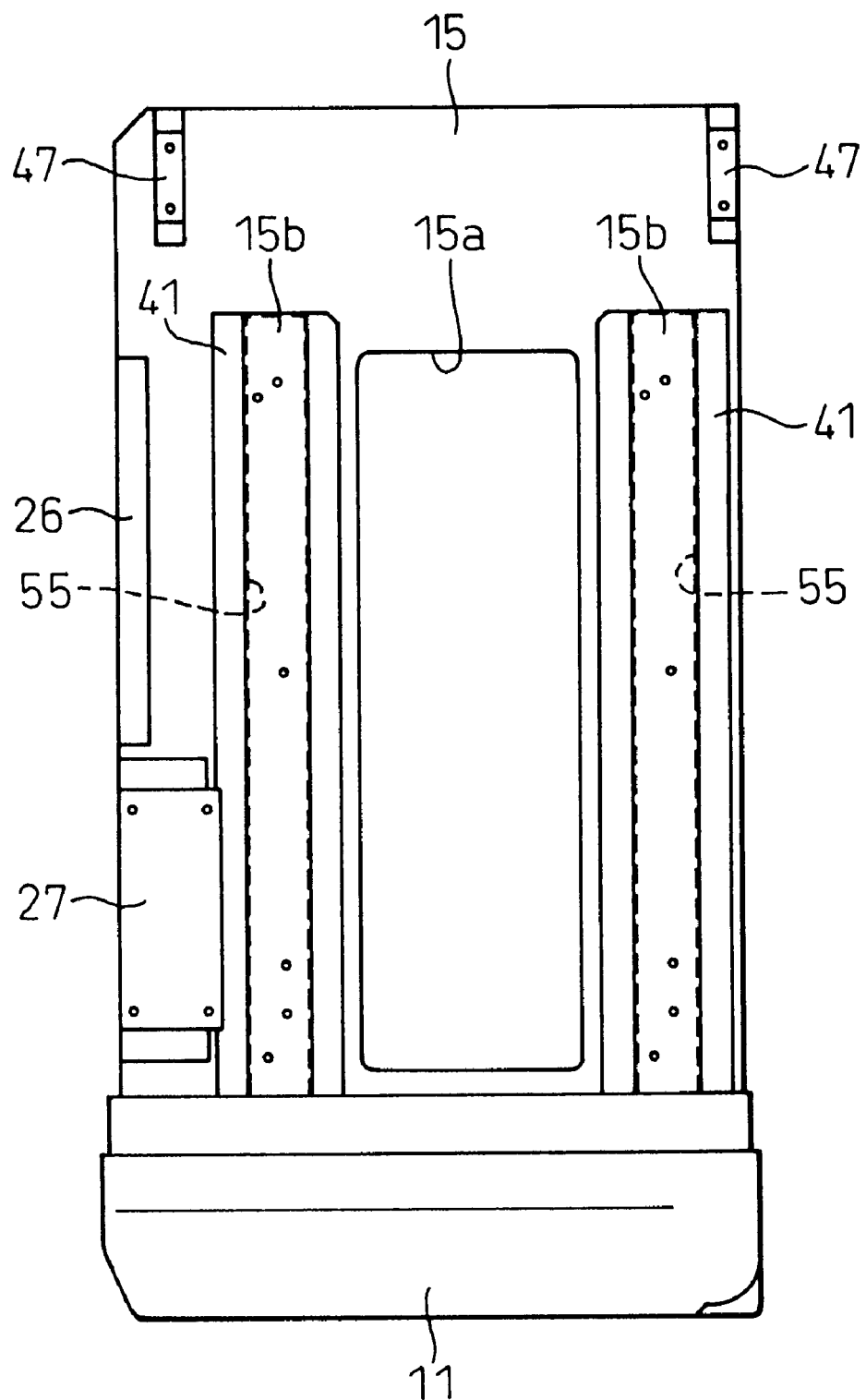
FIG. 4 is a diagrammatic front view of the back board of the power source device.

As shown in FIG. 4, the back board 15 has a rectangular opening 15a, at the center thereof, and vertically extending tubular portions 15b arranged on either side of the opening 15a, the tubular portions 15b being formed by welding elongated plates 41, which have U-shaped troughs in cross section, as shown in FIG. 7, and extend vertically, to front surface of the back board 15. The back board 15 is reinformed by the tubular portions 15b which function as the backbone thereof. The tubular portions 15b constitute a tubular structure.

Figure 5:
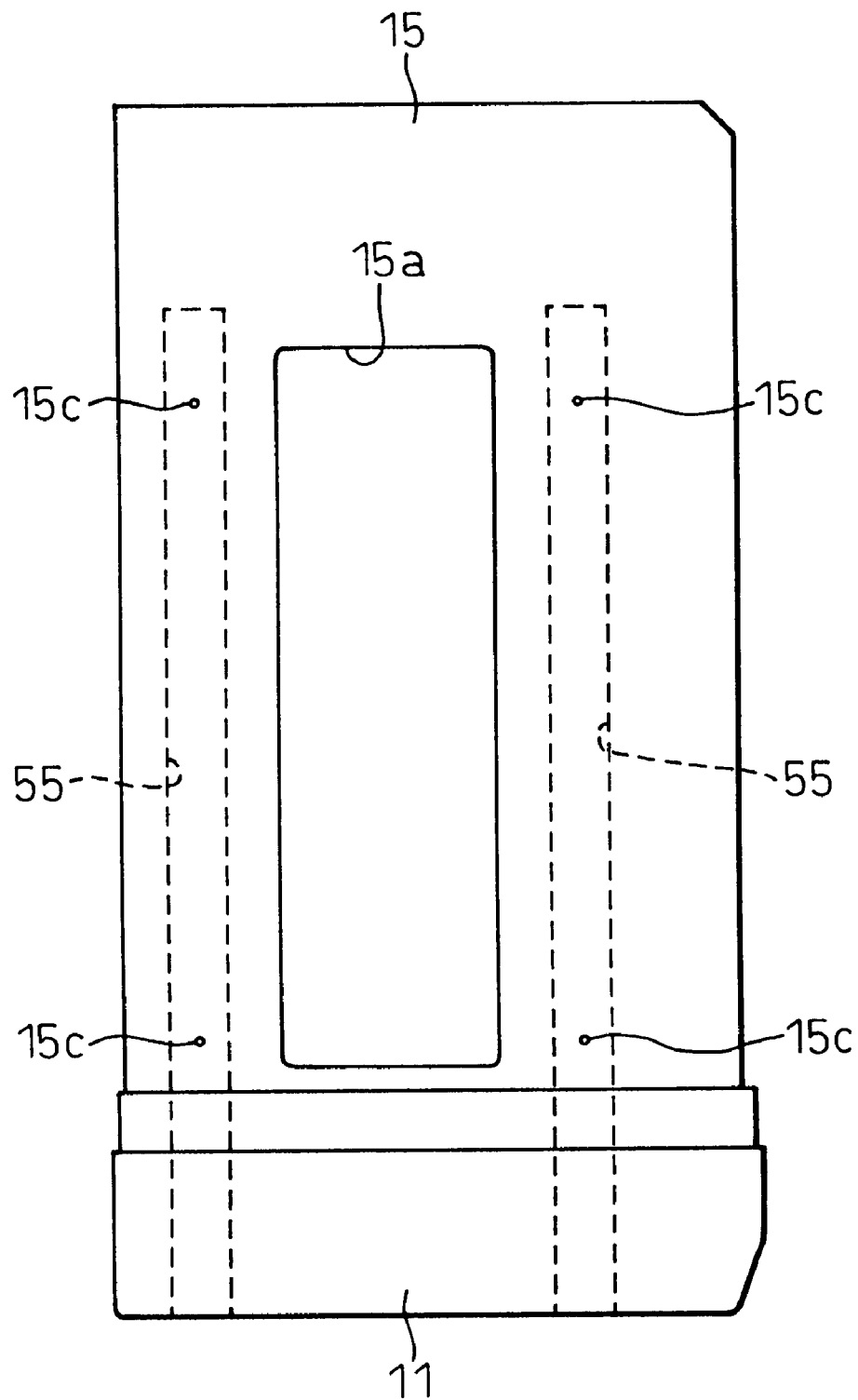
FIG. 5 is a diagrammatic rear view of the back board.

As shown in FIGS. 5, 6A, and 6B, a plurality of assembling holes 15c are formed in the back board 15 at positions corresponding to the two tubular portions 15 for fixing the upper housing 12 to the back board 15. As shown in FIGS. 6A and 6B, welded nuts 42 are secured to the front surface of the back board 15 in alignment with the assembling holes 15c, and as shown in FIGS. 6B and 7, the upper housing 12 is fixed to the back board 15 by screwing fastening members 43 such as screws or bolts inserted into the holes 12b and 15c from the outside, and threaded into the welded nuts 42. Also, as shown in FIGS. 6A and 6B, welded nuts 44 are secured to the internal surfaces of the tubular portions 15b and, as shown in FIG. 7, the base plate 40 is fixed to the back board 15 by screwing screws 45 inserted through the base plate 40 and threaded in the welded nuts 44. Then, the cooling fin plate 39 is fixed to the base plate 40 using screws 46. In addition, as shown in FIG. 4, a pair of left and right supporting portions 47 are welded to the upper left and right portions of the front surface of the back board 15, and the blowers 31 are mounted on the supporting portions 47.

Figure 9:
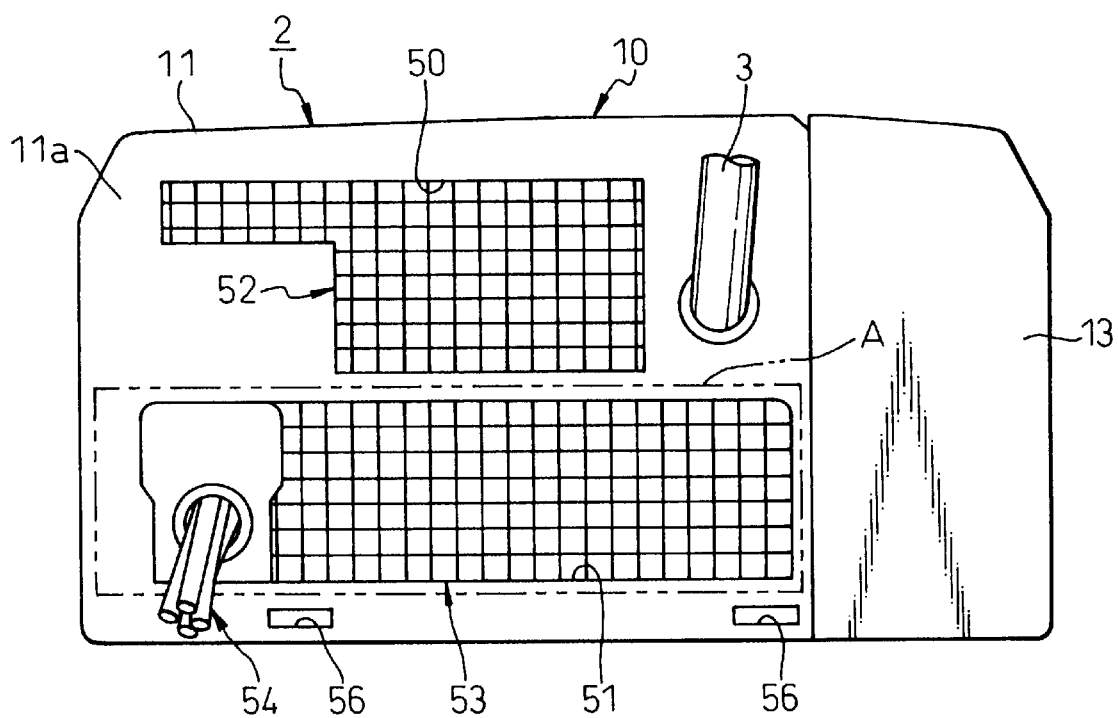
FIG. 9 is a bottom view of the power source device.

As shown in FIG. 9, an intake hole 50 is formed in the bottom of the housing 10, i.e., in the bottom of the lower housing 11 at the front half portion (upper portion as viewed in the figure) thereof and an exhaust hole 51 is formed in the bottom of the lower housing 11 at the rear half portion (lower portion as viewed in the figure). Mesh plates 52 and 53 are attached to the intake hole 50 and the exhaust hole 51, respectively. The mesh plate 53 may be omitted in a case where the exhaust hole 51 is concealed by the stand 5. The intake hole 50 is in communication with a space in the housing 10 and outside the duct 16 and the exhaust hole 51 is in communication with the passage 32 in the duct 16. Additionally, the cable 3 is connected to the bottom surface of the lower housing 11 at a position close to the right on the front side thereof, and a power source cable 54 as power source wiring into which a commercial alternating current is inputted is connected to the bottom surface at a position close to the left on the rear side thereof. Furthermore, a pair of drain ports 56 are opened in the bottom of the lower housing 11 at two positions on the back side thereof in communication with passages 55 (refer to FIGS. 6A, 6B, and 7) formed in the tubular portions 15b. The passages 55 function as drain passages.

Figure 8:
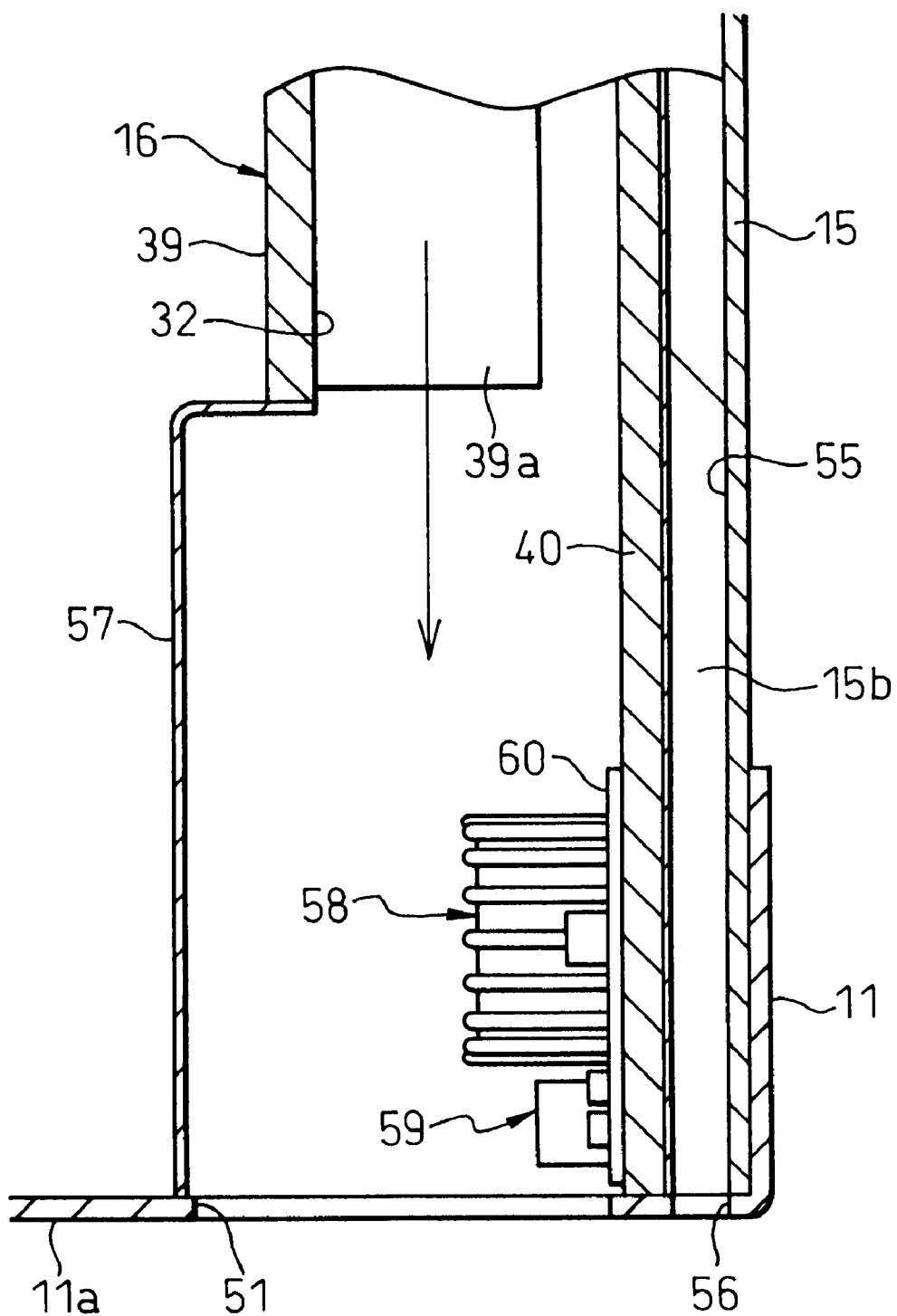
FIG. 8 is a side sectional view showing a lower portion of the duct.

As shown in FIGS. 3 and 8, the duct 16 is covered by a box-like cover 57 below the cooling fin plate 39 to thereby be in communication with the exhaust hole 51. As shown in FIGS. 1 and 8, a filter circuit 58 and a leak preventing circuit 59 are disposed in the duct 16 at a lower end area of the passage 32 where no cooling fins 39a exist. A circuit board 60 to which the two circuits 58 and 59 are mounted is attached to the base plate 40 at a lower end portion of the front surface (i.e., the internal surface of the rear side of the duct 16). The filter circuit 58 is interposed in the power-system circuit at a commercial alternating current input portion to the power source device 2 for removing noise superposed on the input alternating current. Note that the duct 16 is constituted by the members 30, 39, 40 and 57.

As shown in FIG. 1, in the housing 10, when the blowers 31 are driven to rotate the fans 31a, air is forcibly introduced into the passage 32 from the upper opening in the duct 16. This causes the external air to be taken into the housing 10 from the intake hole 50, and the air so taken into then ascends along the front side of the circuit boards 21 and 22 to the upper opening in the duct 16 where the air then flows into the passage 32 for a downward flow therealong to the exhaust hole 51 where the air is let out. Thus, a flow of air is generated within the housing 10 which circulates along a path indicated by arrows in FIG. 1.

The stand 5 supporting the power source device 2 comprises, as shown in FIG. 10, a substantially rectangular tubular stand body 61 and a support plate 62 fixed to the bottom of the stand body 61. A mounting flange 61a is formed at the upper end of the stand body 61 for supporting the bottom of the lower housing 11. A passage 63 in the stand 5 has an opening area which allows communication with the entire area of the exhaust hole 51. The area A indicated by chain lines in FIG. 9 is an area confronting the opening of the passage 63 when the housing 10 is assembled to the stand 5. The power source cable 54 is passed within the passage 63 in the stand 5. The power source device 2 is placed on the mounting flange 61a such that the exhaust hole 51 is in communication with the passage 63 in the stand 5 and the power source cable 54 passes through the passage 63, and is then assembled onto the stand 5 with screws or bolts (not shown) (refer to FIG. 1).

Figure 12:
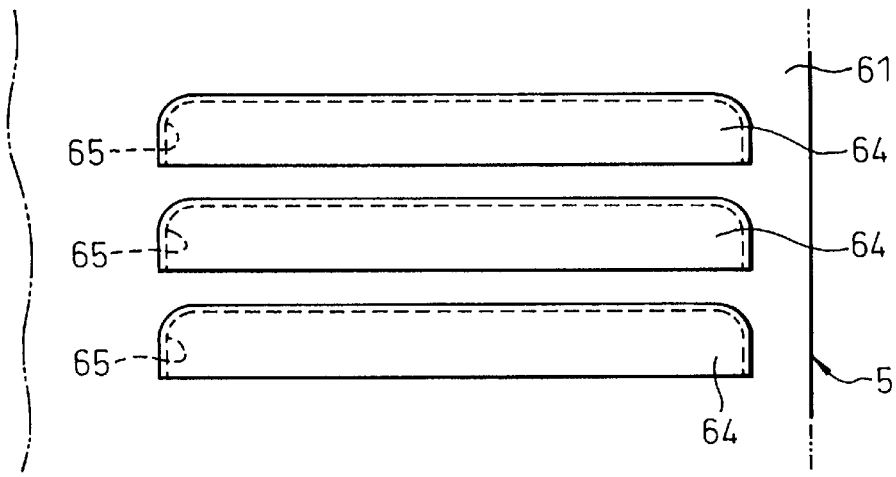
FIG. 12 is a front view of the louver portion of the stand.

In addition, as shown in FIG. 10, a recessed portion 61b is formed in the mounting flange 61a in such a manner as to avoid an area confronting the intake hole 50. A number of louvers extend from the back surface of the stand 5. As shown in FIGS. 11A, 11B, and 12, a number of outlet holes 65 are formed in the back surface of the stand 5, and the louvers 64 are provided so as to cover the outlet holes 65 from above.

In this embodiment, as shown in FIG. 11A, the louvers 64 are constituted by members separate from the stand body 61 and are fixed to upper peripheral portions of the outlet holes 65 in the stand body 61, by welding, at upper edge portions 64a thereof. FIG. 11B shows an integral louver structure formed by a generally used drawing process. The extending length of a louver 91 drawn into a stand plate material 90 is limited by the opening length of an exhaust hole 92.

In this embodiment, in order to have a longer extending length of the louver 64 than that of the drawn louver (FIG. 11B), a louver forming method is adopted in which the separate members are secured (welded) to the stand body 61. As shown in FIGS. 11A and 12, the louvers 64 extend such that outlet holes 65 are substantially concealed as viewed from the front. In addition, as shown in FIG. 11A, when compared with those formed through drawing (FIG. 11B), with the louvers 64, the extending length L from the opening surface of the outlet holes is set longer, whereby a greater opening rate (louver opening area to outlet hole opening area) can be secured.

As shown in FIG. 1, a distribution box 66 of resin is disposed at a position below the louvers 64 (i.e., outlet holes 65). The power source cable 64 is connected within the distribution box to a commercial alternating current line (not shown) taken into the stand 5 via under the ground.

Figure 13:
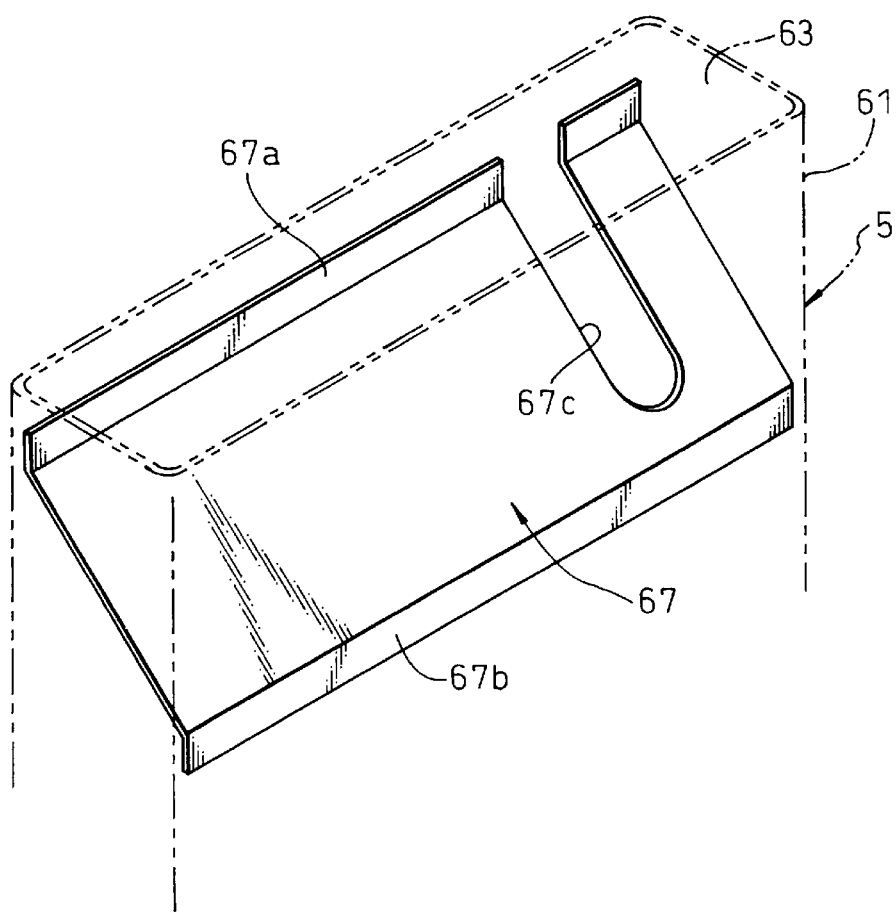
FIG. 13 is a perspective view of the air shielding plate.

As shown in FIGS. 1 and 13, a wind shielding plate 67 is provided, as an air shielding means, at a position above the distribution box 66 in the interior of the stand 5. The air shielding plate 67 is provided so as to shield substantially the entirety of the passage 63 to prevent the hot air, which is exhausted from the exhaust hole 51 into the passage 32, from flowing toward the distribution box 66. Namely, as shown in FIG. 13, the air shielding plate 67 has a width substantially the same as that of the passage 63, and is disposed such that front and rear bent portions 67a and 67b are brought into abutment with internal wall surfaces of the stand body 61, so that the air shielding plate 67 is welded to the stand body 61 for fixation thereto at several positions within the abutment portions.

As shown in FIGS. 1 and 13, the air shielding plate 67 is obliquely disposed such that a portion thereof close to the back side of the stand 5 is lower than a portion thereof close to the front side of the stand 5, so that exhaust air from the exhaust hole 51 is guided so as to flow toward the exhaust holes (as shown in FIGS. 11A to 12). As shown in FIG. 13, a cutout (an insertion recess) 67c is formed in the air shielding plate 67, so that the power source cable 54 extending between the power source device 2 and the distribution box 66 can pass out through the cutout 67c.

The operation of the charger 1 will be described below.

When the feeding paddle 4 is inserted into the receiving charge port 7 of the electric automobile 6, charging is started in a charging condition in response to a residual capacity of the battery obtained from the electric automobile 6 through communication. During charging, heat is generated from the various electric circuits incorporated in the power source device 2, and when the temperature within the housing 10 reaches and exceeds a set temperature, the blowers 13 are started.

A flow of air circulating along a path indicated by the arrows in FIG. 1 is generated within the housing 10 while the blowers 31 are driven. Therefore, the various circuit boards 21 and 22 and the electric components 24 and 25 are cooled by the ascending airflow, and then a heat exchange is performed between the air descending through the passage 32 in the duct 16 and the cooling fins 39a, whereby the circuit boards 21 and 22 are cooled by the fins 39a so cooled through the heat exchange, and the various circuits 58 and 59 disposed at the lower end area of the passage 32 are also cooled with the airflow.

Since an air forcing system is adopted in which air is forced into the passage 32 in the duct by the blowers 31 disposed substantially at the intermediate position along the length of the airflow path which corresponds to the position on the upper portion of the duct 16, when compared with a system in which blowers are disposed in the vicinity of an exhaust hole, an airflow with a required flow rate and flow velocity can be generated with a relatively small blowing force. In other words, if blowers 31 are used whose air blowing capacities are identical, the air forcing system can provide a relatively high cooling efficiency. Owing to this, a reduction in number and size (or power consumption) of blowers 31 to be disposed can be attempted.

Since the blowers 31 disposed on the upper portion of the duct 16 are located at an upper position in the housing 10, a high waterproof effect can be provided against water penetrating into the housing 10 from, for example, the exhaust hole 51. With the conventional air take-in system, in which blowers are disposed in the vicinity of the exhaust hole so as to blow air into the housing from the downstream end position of the airflow path to generate an airflow, there is a risk of water trapped in a gap between the stand and the power source device tending to penetrate into the housing from the exhaust hole whereby the blowers are submerged under the water. To cope with this, with the air take-in system, special waterproofing countermeasures are required. In contrast with this, according to the air force-in system of the embodiment, since the blowers 31 are disposed at positions above the upper portion of the duct 16, which are relatively high in the housing 10, there is no concern that the blowers 31 are submerged under water without any special waterproofing countermeasures.

The hot air which has passed through the duct 16 is let out from the exhaust hole 51 into the stand 5 and then passes through the passage 63 in the stand 5 to thereby be let out to the outside of the power source device. When this takes places, the louvers 64 provided on the respective outlet holes 65 extend so as to conceal the exhaust holes 65 when viewed from the front and the extending distance L from the opening surface of the exhaust hole 65 can be set longer when compared with the louvers formed through drawing, due to the adoption of the separate member welding construction. This allows the higher opening rate of the louvers 64 to be secured, and the airflow is then allowed to circulate smoothly within the housing 10 (the opening of the louver 64 does not constitute a rate controlling portion for determining the rate of an airflow), whereby the cooling effect on the various circuits within the housing 10 can be improved and the penetration of water such as rain water from the outlet holes 65 covered with the louvers 64 into the housing 10 is made difficult.

According to the embodiment that has been described heretofore, the following advantages can be provided.

(1) Since the air force-in system is adopted in which the blowers 31 are positioned substantially at the intermediate position along the length of the airflow path by disposing the blowers 31 on the upper position of the duct 16, with the same blowing force, an airflow having relatively higher flow rate and flow velocity can be generated within the duct 16, whereby the cooling efficiency of the various types of circuits within the housing 10 can be improved. In addition, since the blowers 31 are positioned at the higher position in the housing 10, should water such as rain water penetrate into the housing from the exhaust vent 51, the blowers 31 can be prevented from being submerged under the water.

(2) Since the duct 16 is constructed by forming the cooling fin plate 39, to which the circuit boards 21 and 22 are directly assembled, into the duct-like shape, the circuit boards 21 and 22 can be efficiently cooled through heat exchange performed between air flowing through the passage 32 in the duct 16 and the cooling fins 39a. In addition, since the cooling fin plate 39 also functions as a constituent component of the duct 16, the number of components that are to be accommodated in the housing 10 can be reduced, this making the accommodating space compact, whereby the housing 10 can be miniaturized and hence the power source device 2 can also be miniaturized.

(3) Since the back board 15 to which the duct 16 is assembled is metallic and provides a high heat conductivity, heat can escape efficiently from the duct 16 to the back board 15, whereby the cooling effect on the circuit boards 21 and 22 can be improved further.

(4) Since the back board 15 to which the duct 16 is assembled is also used for assembling the housing 10, the number of components used within the housing 10 can be reduced through such a combined use, and this contributes to the miniaturization of the power source device 2. In addition, since the housing 10 is made of metal, heat which is heat exchanged at the duct 16 is transmitted to the housing 10 via the back board 15, whereby the heat dissipation effect of the duct 16 can be improved, the cooling effect on the circuit boards 21, 22 being thereby be improved further.

(5) A fixing structure is adopted in which the housing 10 is assembled and fixed to the back board 15 using the fastening members 43, and therefore there is a concern that water may penetrate into the housing 10 from gaps between the fastening members 43 and the assembling holes 15c. However, water can only penetrate into the tubular portions 15b, and moreover, since the tubular portions 15b constitute the drain passages 55, water that has so penetrated can be drained through the drain passages 55 via the drain ports 56, and there can be eliminated any risk of the various circuit boards 21, 22 and 60 and various electric components 24, 25 and 31 which are all accommodated within the housing 10 being submerged under the water that has penetrated into the housing. In addition, since the reinforcement is provided by the tubular portions 15b, the back board 15 can provide a relatively high strength for its thickness.

(6) By disposing the electric circuits 58 and 59 within the passage 32 in the duct 16 the electric circuits 58 and 59 can be cooled, and the component accommodating space within the housing 10 can be saved, thus contributing to the miniaturization of the power source device 2.

(7) A structure is adopted in which the louvers 64 are welded to the stand body 61 as separate members, whereby the louvers 64 are allowed to extend such that the exhaust holes 65 are concealed when viewed from the front, and the extending length L from the opening surface of the exhaust hole 65 can be set longer, when compared with those formed through drawing, to thereby make it possible to secure a greater opening rate for the louvers 64. Owing to this, the airflow circulates smoothly within the housing 10 to thereby improve the cooling effect on the various circuit boards 21, 22 and 60, and the penetration of water such as rain water through the outlet holes 65 can be prevented by means of the louvers 64.

(8) The hot air let out from the exhaust hole 51 into the stand 5 is guided toward the outlet holes 65 by the air shielding plate 67 such that the hot air is prevented from flowing toward the resin distribution box 66. This allows the resin distribution box 66 disposed within the stand 5 to be protected from the hot air.

The present invention is not limited to the aforesaid embodiment but the embodiment may be changed and modified as follows, for example.

Figure 15B:
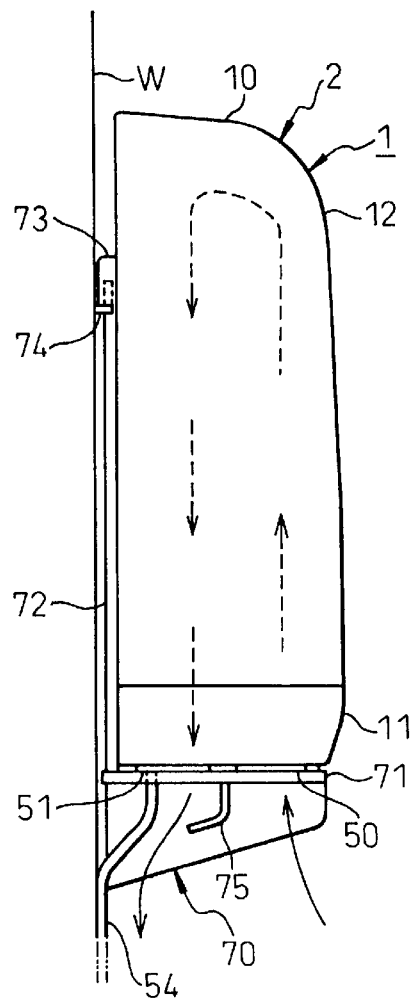
FIG. 15B is a side view of the wall mounted type charger.
Figure 15A:
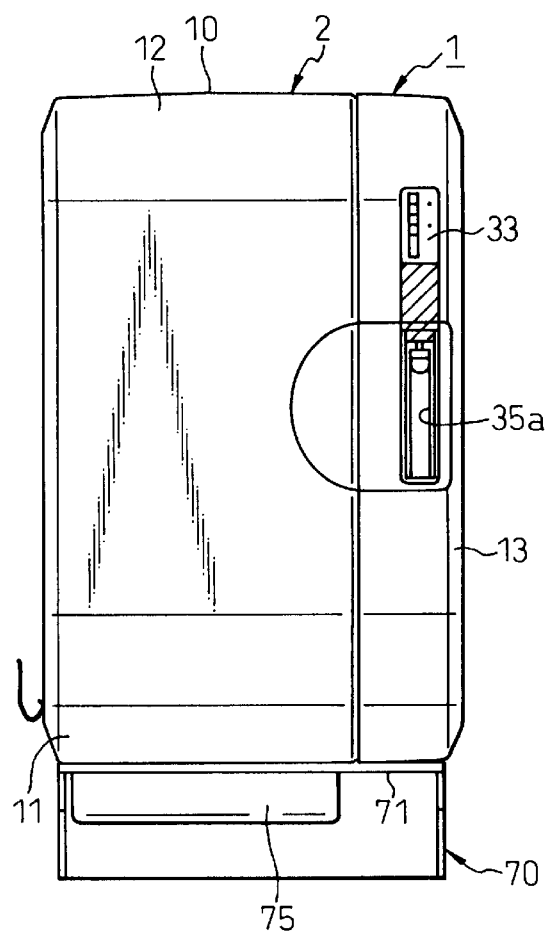
FIG. 15A is a front view of a wall mounted type charger.

In a wall mounted type charger, a partition means may be provided so as to avoid the mixture of air entering the intake hole and air let out of the exhaust hole. In other words, as shown in FIGS. 15A and 15B, the power source device 2 is mounted to a wall W in such a manner that a hanging portion 73 provided at an upper part of a back supporting portion 72 is secured by a pin 74 driven in the wall W, in a state that the power source device 2 is placed on a supporting table 71 of a mounting bracket 70 formed into an L-shape as viewed from the side. A partition plate 75 extends downward at a position along a boundary line between an intake hole 50 and an exhaust hole 51 in the bottom of the supporting table 71. The partition plate 75 has a configuration in which it is bent toward the back side at a distal end thereof so that hot air let out from the exhaust hole 51 is guided toward the back side whereby the hot air will not tend to be mixed with outside air that is to be taken in from the intake hole 50. Both the intake hole 50 and the exhaust hole 51 are formed in the bottom surface 11a of the housing 10 so that water such as rain water will not possibly enter the housing 10. Even if the intake hole 50 and the exhaust hole 51 are formed in the same plane like this, since air entering the intake hole 50 and air let out from the exhaust hole 51 are not easily mixed with each other by the provision of the partition plate 75, air having a relatively low temperature can be taken into the housing 10. Thus, even with the wall mounted type charger 1, the cooling efficiency of the circuit boards 21, 22 and 60 inside the housing 10 can be enhanced. Note that in FIGS. 15A and 15B, a cable 3 and a feeding paddle 4 are omitted.

Figure 16:
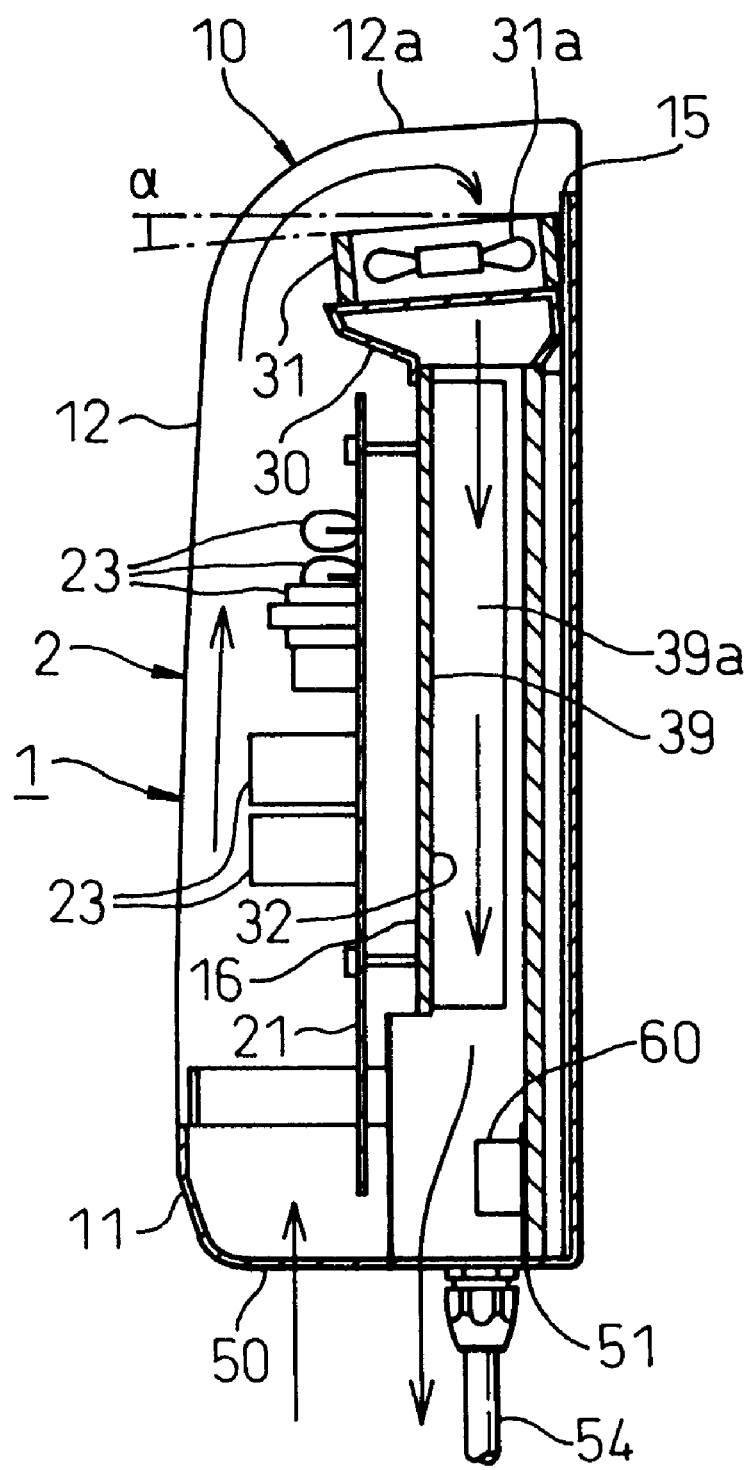
FIG. 16 is a diagrammatic side sectional view of a power source device according to another embodiment.

As shown in FIG. 16, the blowers 31 may be disposed in an inclined posture in accordance with an inclined angle of the upper surface 12a of the housing 10 which is so inclined. The blowers 31 are disposed in a posture in which they are inclined downward at an angle of a degrees relative to the horizontal plane on the front side thereof. The hood 30 is formed such that the upper opening surface thereof is inclined at the angle of a degrees so that the blowers 31 can be placed thereon in the inclined fashion. According to this structure, the height of the housing 10 can be reduced, whereby the power source device 2 can easily be miniaturized.

The positions where the intake hole and the exhaust hole are formed are not limited to the bottom of the housing 10, but the holes may be opened in any positions in the lower portion of the housing 10. For example, at least either of the intake hole and the exhaust hole may be formed in a position other than on the bottom of the housing such as at a lower portion on the side surface, the back surface or the front surface of the housing. In short, the holes may be formed in any positions that can generate, within the housing, an airflow which is taken in from the lower portion of the housing (outer casing) and is let out from the lower portion of the housing.

The metallic portions on the duct are not limited to those described in the embodiment. It would be sufficient if at least the board-like portion to which the circuit boards are directly assembled, the fins and the portion constituting the heat conductive path to the fins are formed of metal. For example, the board-like portion to which the base plate 40 and the circuit boards are not directly assembled (for example, the left-hand side portion of the duct) may be formed of a heat resistant material other than metal (for example, resin). Alternatively, the duct may be formed into an integral tube.

The number of blowers are not limited to two, but one or more than two blowers may be used.

The support board (back board 15) may be formed of resin. Resin is suitable for mass production. Additionally, the advantages described under (1) and (7) above can also be obtained in a similar fashion.

In a case where the tubular structures (the tubular portions 15b) of the support board (the back board 15) commonly function as drain passages, the structure thereof is not limited to a structure in which a plurality of tubular structures extend straight vertically. It would be sufficient if the tubular structures are formed such that the portions of the flow paths extending downward below the assembling holes 15c may be formed into at least a shape which facilitates the drainage of water. For example, an inverted U-shaped flow path, an inclined straight flow path or a winding flow path may be adopted. In addition, the position of the drain port is not limited to the bottom of the housing 10 but the drain port may be formed in a lower portion on the side of the housing. With this construction, the advantages provided under (1) and (7) and the like can be obtained similarly.

The tubular structures (the tubular portions 15b) may not commonly function as the drain passages. In other words, the tubular structures may be adopted only for the purpose of reinforcement. The tubular structures may be a path allowing no water to be drained therethrough, and for example, the tubular structures may be formed into a transversely extending path or a U-shaped path. In addition, the structures may be formed into a path allowing water to be drained therethrough but without any drain port. With the construction, the advantages provided under (1) and (7) and the like may equally be obtained.

The support board (the back board 15) may not be provided with the tubular structures. With a larger thickness, the required strength of the support board can be secured. With the construction, the advantages provided under (1), (7) and the like may equally be obtained.

The support board to which the duct is assembled is not limited to the back board 15 disposed on the back side of the power source device 2. For example, the intake hole and the exhaust hole may be reversely disposed transversely and the duct may also be disposed on the front side, whereby the support board that supports the duct may also be disposed on the front side.

Only the power-system circuit board 21 of the two types of circuit boards 21 and 22 may be constructed so as to directly be assembled to the duct. In addition, the capacitor 24 and the coil 25 may be installed on the circuit board 21. Additionally, the other electric components constituting the power-system circuit may be removed from the circuit board.

The blowers may be disposed in the vicinity of the intake vent and the exhaust vent. Namely, a full air force-in system may be adopted in which an airflow is generated by blowing air into the housing in the vicinity of the intake vent, or a full air take-in system may be adopted in which an airflow is generated by blowing air into the outside of the housing in the vicinity of the exhaust hole. Even if these systems are adopted, the advantage provided under (7) can be obtained in which the louvers 64 are securely fastened to the stand body as the separate members An air shielding means may not be provided. For example, the distribution box may be formed of a heat resistant resin or the distribution box may be covered with a heat shielding cover. In addition, if a construction is adopted in which the distribution box is disposed on the external surface of the stand 5, no countermeasures are required against hot air.

In the stand type charger, an exhaust passage may not be provided inside the stand 5 but exhaust air may be let out directly from the exhaust vent in the housing.

The connection between the feeding coupler constituting the charger and the receiving apparatus is not limited to insertion. In short, any connecting construction may be adopted which allows the power transmitting coil and the receiving coil to be disposed close enough to provide an electromagnetic induction action.

The vehicle is not limited to an electric automobile, but the present invention may be applied to any vehicle using a battery as a power source such as industrial vehicles like battery-type forklift trucks or a battery-type carrier trucks. In addition, the vehicle is not limited to a vehicle adapted to be driven only by a battery, but the present invention may be applied to a hybrid vehicle adapted to be driven by fuel (petrol) and a battery.

Additional technical ideas that can be grasped from the embodiments will be described below.

(1) The support board is intended as a member to which the outer casing of the power source device is assembled, and on which the reinforcement tubular structures are integrally formed, the outer casing being assembled using the fastening members through the assembling holes formed in the tubular structures, the interior portions of the tubular structures which communicate with the assembling holes function as the drain passages. According to this construction, an advantage similar to that provided according to the sixth aspect of the present invention can be provided.

(2) The outer casing is metallic. According to the construction, heat from the electric components which are heat exchanged through the duct is transmitted to the outer casing via the support board, thereby improving the dissipation effect, and therefore the cooling effect on the electric components can further be improved.

(3) The intake hole and the exhaust hole are formed in the bottom of the outer casing of the wall mounted type charger. In this case, even if the intake hole and the exhaust hole are formed in the bottom, among six sides, of the outer casing so that rain water will not enter the outer casing, since air entering the intake hole and air let out of the exhaust hole are prevented from being mixed with each other by the partition means, hot air is prevented from being taken into the outer casing, whereby electric components having a good cooling effect can be obtained.

The following advantages are obtained according to the present invention.

According to present invention, since the air forcein system is adopted in which the blowers are disposed on the upper portion of the duct which corresponds to the intermediate position of the airflow path within the box unit, the flow rate and flow velocity of the airflow that can be obtained when the blowers are driven can be relatively high, and since the blowers are positioned at an upper portion within the outer casing, even if water enters the outer casing, the blowers are prevented from being submerged under water.

The cooling effect of the electric components can be improved by allowing heat obtained from the electric components, through heat exchange by the airflow flowing through the duct, to escape from the duct to the metallic support board, and the support board is also used in assembling the outer casing, and therefore the number of components within the outer casing can be reduced, thereby contributing to miniaturization of the power source device.

Even if the outer casing is constructed so as to be assembled to the support board using the fastening members, since water entering the outer casing from the gaps between the fastening members and the assembling holes is drained through the drain passages formed in the tubular structures, the electric components can be prevented from being submerged under water.

The electric components can be cooled and the component accommodating space within the outer casing can be saved, by disposing the electric circuit within the passage in the duct, this contributing to the miniaturization of the power source device.

The louvers can by securely fastened to the stand as separate members and, when compared with louvers formed through a drawing process, the wider opening area of the louvers are ensured so as to implement a smooth discharge of exhaust air from the exhaust hole whereby, with a better air circulation inside the outer casing, a good cooling effect can be provided. In addition, the louvers extend such that the outlet holes are substantially concealed when viewed from the front, whereby water such as rain water can be prevented from entering the stand through outlet holes.

In the wall-mounted-type charger, air entering the intake hole and air let out of the exhaust hole are separated by the partition means so that they do not mix with each other, and the hot air let out of the exhaust hole is prevented from being directly taken into the intake hole as much as possible, and therefore the cooling effect of the electric components within the outer casing can be improved.

I claim:

1. A charger for a vehicle, comprising a power source unit and a feeding coupler connected to said power source unit via a cable and adapted to be coupled to a receiver of a vehicle, said power source unit comprising:

an outer casing having a top, a bottom with an intake hole and an exhaust hole;

a duct having a vertically extending passage disposed in said outer casing, said passage having an upper opening and a lower opening, said duct enclosed by said outer casing; and a cooling blower disposed in said outer casing above said duct so that said blower causes a flow of air in which air is taken into said casing from said intake hole, enters said passage of said duct via said upper opening, flows down in said passage, and flows out of said outer casing via said lower opening and said exhaust hole.

2. A charger as set forth in claim 1, wherein said duct comprises a cooling fin plate formed into a duct-like shape, and wherein a circuit board having electric components mounted thereto is directly attached to said cooling fin plate.

3. A charger as set forth in claim 2, wherein a support board to which said duct is attached is made of metal.

4. A charger as set forth in claim 1, wherein the top of said outer casing is formed inclined, and wherein said blower is disposed in an inclined posture in accordance with the inclination of said top of said outer casing.

5. A charger for a vehicle, comprising a power source unit and a feeding coupler connected to said power source unit via a cable and adapted to be coupled to a receiver of a vehicle, said power source unit comprising:
   an outer casing having a top, a bottom with an intake hole and an exhaust hole;
   a duct having a vertically extending passage disposed in said outer casing, said passage having an upper opening and a lower opening, said duct enclosed by said outer casing;
   a cooling blower disposed in said outer casing above said duct so that said blower causes a flow of air in which air is taken into said casing from said intake hole, enters said passage of said duct via said upper opening, flows down in said passage, and flows out of said outer casing via said lower opening and said exhaust hole; and
   a support board to which said duct is attached being made of metal, said outer casing being assembled onto said support board.

6. A charger as set forth in claim 5, wherein a reinforcing tubular structure is formed on said support board, said outer casing being fixed to said reinforcing tubular structure by fastening members extending in assembling holes formed in said tubular structure, the interior of said tubular structure communicating with said assembling holes functioning as a drain passage.

7. A charger as set forth in claim 1, wherein an electric circuit is disposed in said passage of said duct.

8. A charger as set forth in claim 5, wherein an electric circuit is disposed in said passage of said duct.

9. A charger for a vehicle, comprising a power source unit, a feeding coupler connected to said power source unit via a cable and adapted to be coupled to a receiver of a vehicle, and a stand supporting the power source unit;
   said power source unit comprising:
      an outer casing having a top, a bottom with an intake hole and an exhaust hole;
      a duct having a vertically extending passage disposed in said outer casing, said passage having an upper opening and a lower opening, said duct enclosed by said outer casing;
      a cooling blower disposed in said outer casing above said duct so that said blower causes a flow of air in which air is taken into said casing from said intake hole, enters said passage of said duct via said upper opening, flows down in said passage, and flows out of said outer casing via said lower opening and said exhaust hole;
   said stand comprising a tubular body having an internal space and outlet holes formed through said tubular body, said power source unit being fixed to said stand with said exhaust hole in communication with said internal space; and
   louvers formed separately from and attached to said tubular body so that said louvers substantially cover said outlet holes, as viewed in a direction perpendicular to an outer surface of said tubular body, and an extending length of said louver measured from said tubular body in said direction is longer than that of a louver which is formed by a drawing process.

10. A charger as set forth in claim 9, wherein a resin distribution box to which power source wiring connected to said power source unit is connected is disposed in said stand below said outlet holes and an air shielding member is provided in said stand for preventing hot air let out from said exhaust hole from flowing toward said distribution box.

11. A charger for a vehicle, comprising a power source unit and a feeding coupler connected to said power source unit via a cable and adapted to be coupled to a receiver of a vehicle, said power source unit being of a wall mounted type and comprising:
   an outer casing having a top, a bottom with an intake hole and an exhaust hole;
   a duct having a vertically extending passage disposed in said outer casing, said passage having an upper opening and a lower opening, said duct enclosed by said outer casing;
   a cooling blower disposed in said outer casing above said duct so that said blower causes a flow of air in which air is taken into said casing from said intake hole, enters said passage of said duct via said upper opening, flows down in said passage, and flows out of said outer casing via said lower opening and said exhaust hole; and
   a partition member disposed below said outer casing for separating a region including said exhaust hole from a region including said intake hole.

* * * * *